3,509,229
**EPOXIDE RESINS CURED WITH ALIPHATIC POLY-
AMINES IN ADMIXTURE WITH ARYL SULFON-
AMIDE-ALDEHYDE RESINS**
David A. Shimp and Francis B. Alvey, Louisville, Ky., assignors to Celanese Coatings Company, New York, N.Y., a corporation of Delaware
No Drawing. Filed Sept. 5, 1967, Ser. No. 665,244
Int. Cl. C08g 45/10
U.S. Cl. 260—834
8 Claims

ABSTRACT OF THE DISCLOSURE

Room temperature curable compositions useful in coatings and in moldings, encapsulations and other plastics applications made from a blend of an epoxide resin and a polyamine with, as an accelerator, an aryl sulfonamide-aldehyde resin.

BACKGROUND OF THE INVENTION

The field of art to which this invention pertains is thermosetting resins, particularly room temperature curing polyepoxide resins.

The reaction of epoxide resins with aliphatic polyamines to form cured products is well known and is described in such publications as "Epoxy Resins" by Lee and Neville, McGraw-Hill Book Company, Inc., New York (1957). Even though aliphatic polyamines are widely used as epoxide resin curing agents, there are some inherent disadvantages in their usage. Castings and coatings made from epoxide resins and aliphatic polyamines, particularly when cured at room temperature and under atmospheric conditions, often have greasy uneven surfaces. Such surface conditions are caused by the reactivity of the amines to atmospheric moisture and carbon dioxide. Amine carbonates form at the surface and these hygroscopic salts absorb moisture from the atmosphere, presenting a wet appearance. This surface phenomenon is often described as being an exudation of the amine to the surface and has been termed "sweat-out," "blush" or "bloom." This condition is undesirable not only aesthetically but also functionally in that intercoat and interlaminar adhesion is impaired.

Aliphatic polyamines generally give fast cures and provide over-all properties which are satisfactory for a wide variety of commercial applications.

However, in many room temperature curing applications, particularly when used for forming thin sections or films, the curing reaction is slow and ultimate properties are not attained without the use of an accelerator. Many conventional accelerators, such as phenols and tertiary amines, are dermatitic and require special handling precautions. Phenolic modifiers also form complexes which gives an undesirable color to the product.

U.S. Patent 2,494,295, describes the use of aryl sulfonamide-aldehyde resins as curing agents for epoxide resins either alone or in admixture with small amounts of catalysts, such as aliphatic amines, alkali metal hydroxides and alkali phenoxides. The reaction of the aryl sulfonamide-aldehyde resins with epoxide resins when conducted according to this patent requires heating to effect a cure. The compositions described by the patent are heat curable systems and are not room temperature curable.

U.S. Patent No. 2,712,001 is directed to the reaction of aromatic sulfonamides with epoxide resins. The disadvantages of using aromatic sulfonamides as curing agents for epoxide resins are the high melting points of the sulfonamides and the insolubility of the sulfonamides in the epoxide resins. Ortho-toluene sulfonamide melts at 156° C. and the para isomer at 137° C. Strong solvents and/or continuous heating at elevated temperatures are required to dissolve the sulfonamide in the epoxide resin and to keep the sulfonamide dissolved before curing.

SUMMARY OF THE INVENTION

This invention relates to the coreaction of epoxide resins with aliphatic polyamines and aryl sulfonamide-aldehyde resins and to the crosslinked infusible, insoluble products resulting therefrom. In particular, this invention pertains to epoxide resins reacted with aliphatic polyamines using as an accelerator aryl sulfonamide-aldehyde resins to produce cured compositions having improved physical and surface properties.

This invention is directed to room temperature curable compositions made from an epoxide compound containing more than one 1,2-epoxide group per molecule, an aryl sulfonamide-aldehyde resin and an aliphatic polyamide containing more than two active amine hydrogens per molecule. The aryl sulfonamide-aldehyde resin is the reaction product of 1.1 to about 1.4 mols of aryl sulfonamide to 1 mol of aldehyde. The aryl sulfonamide-aldehyde resin and the aliphatic polyamine are present in the ratio of about 5 to 50 parts by weight of the aryl sulfonamide-aldehyde resin to about 50 parts by weight of the aliphatic polyamine. The aryl sulfonamide-aldehyde resin and the aliphatic polyamine are reacted with the epoxide resin in the equivalent ratios of about 0.75 to about 1.5 equivalents of aryl sulfonamide-aldehyde resin plus aliphatic polyamine to 1 equivalent of epoxide resin, wherein the equivalents of aryl sulfonamide-aldehyde resin and aliphatic polyamine are equal to the active amide hydrogens and the active amine hydrogens respectively and wherein the equivalents of the epoxide resin are equal to the 1,2-epoxide content.

Aryl sulfonamide-aldehyde resins when used alone or with catalytic amounts of other reactants are substantially non-reactive with epoxide resins under room temperature curing conditions. However, when used according to this invention, these resins function both as accelerators for epoxide-amine reactions and as co-reactants. Thorough cures with resultant improved properties are obtained in a short time without the application of heat. This accelerating effect is particularly important in the cure of thin sections where the exothermic heat of reaction dissipates without raising the temperature of the thin sections.

In the presence of the aliphatic polyamines, the active amide hydrogens of the aryl sulfonamide-aldehyde resins react with the epoxide resins. They become an integral part of the cross-linked network, thereby contributing to the chemical and physical resistance properties of the cured composition, particularly as evidenced by low solvent absorption.

Aryl sulfonamide-aldehyde resins are not sensitive to atmospheric moisture and carbon dioxide. This property, in conjunction with the accelerating effect, improves the surfaces of coating and castings exposed to the atmosphere during the cure by preventing or minimizing "sweat-out," "blush" or "bloom."

Aryl sulfonamide-aldehyde resins are non-dermatitic, are light colored and do not form color complexes with amines or epoxide resins, thereby contributing to the handling and aesthetic properties of the resulting compositions.

The compositions of this invention are useful in seamless flooring applications, tile-like coatings, plastic tooling, laminates and in general purpose room temperature usage.

DESCRIPTION OF THE INVENTION

The aryl sulfonamide-aldehyde resins useful in this invention are the acid catalyzed condensation products of aryl sulfonamides and aldehydes as described in "The Chemistry of Synthetic Resins" by Carleton Ellis, Reinhold Publishing Corp., New York (1935). The aryl sulfonamides useful in preparing these resins contain one sulfonamide group directly attached to the aromatic ring and include ortho, meta and para-toluene sulfonamide, benzene sulfonamide, naphthalene sulfonamide, halobenzene sulfonamides, nitrobenzene sulfonamides and the like.

The aldehydes useful in preparing these resins are aliphatic aldehydes containing one aldehyde group and from 1 to about 8 carbon atoms. Such aldehydes include formaldehyde, acetaldehyde, propionaldehyde, butyraldehyde, valeraldehyde, heptaldehyde, and formaldehyde producing compounds such as paraformaldehyde and trioxane.

The aryl sulfonamide-aldehyde resins useful in this invention are formed from the reaction of the aldehyde with a molar excess of aryl sulfonamide, preferably from about 1 mol of aldehyde with about 1.1 to about 1.4 mols of aryl sulfonamide. The preferred resins are para-toluene sulfonamide-formaldehyde resins having a melting or softening point of about 40 C. to about 80° C.

The aliphatic polyamines useful in this invention are those which contain at least two amine nitrogens and more than two active amine hydrogens per molecule. Examples of such amines are the alkylene polyamines, such as ethylene diamine, diethylene triamine, triethylene tetramine, tetraethylene pentamine, iminobispropyl amine, methyliminobispropyl amine, hexamethylene diamine and the like. Included among these amines are cyanoethylated and hydroxyalkylated aliphatic polyamines, which can be prepared by reacting amines, such as the alkylene polyamines, with acrylonitrile and monoepoxides, such as ethylene oxide, propylene oxide, and monoglycidyl ethers and esters. Amine adducts which are formed by reacting epoxide resins with an excess of an aliphatic polyamine, are also useful in this invention.

Other useful aliphatic polyamines are the amido amines, which are made by reacting aliphatic polyamines with mono and dicarboxylic acids, particularly fatty acids and dimerized fatty acids.

Still other aliphatic polyamines are the fatty polyamines, which can be made by reacting a simple polyamine with acrylonitrile followed by reduction of the nitrile group to the amine group. Examples of fatty amines are N-oleyl-trimethylene diamine, N-lauryl-trimethylene diamine, N-(3-aminopropyl) - 2 - aminopentadecane, N - stearyl-ethylene diamine, N-palmityl-tetramethylene diamine, N-oleyl-ethylene diamine and N-oleyl-1,3-propanediamine.

The epoxide resins useful in this invention are epoxide resins which contain more than one 1,2-epoxide group per molecule and no other groups reactive with amines and sulfonamide groups. They can be saturated or unsaturated aliphatic, cycloaliphatic, aromatic or heterocyclic and can be monomeric or polymeric in nature.

Useful epoxide resins include glycidyl ethers of polyhydric phenols obtained by reacting a polyhydric phenol in an excess of epichlorohydrin with sodium hydroxide. Such polyhydric phenols include bisphenol A (p,p'-dihydroxydiphenyl propane), resorcinol, hydroquinone, 4,4'-dihydroxybenzophenone, bis(4-hydroxyphenyl) ethane, 1,5-dihydroxynaphthalene, 4,4'-dihydroxybiphenyl, and novolak resins containing more than two phenol moieties linked through methylene bridges.

Other glycidyl ethers of polyhydric phenols are polymers prepared by reacting 1.1 up to about 2 mols of epichlorohydrin with 1 mol of dihydric phenol or by reacting diepoxides with added dihydric phenols.

Additional epoxide resins are glycidyl ethers of polyhydric alcohols made by reacting a polyhydric alcohol and epichlorohydrin with an acidic catalyst such as boron trifluoride and subsequently treating the resulting product with an alkaline dehydrohalogenating agent. Included among the polyhydric alcohols that can be used in the preparation of these polyepoxides are glycerine, ethylene glycol, propylene glycol, diethylene glycol, hexanetriol, pentaerythritol, trimethylol ethane and trimethylol propane.

Still other epoxide resins include glycidyl esters of polycarboxylic acids, such acids being azelaic acid, adipic acid, isophthalic acid, terephthalic acid, dimerized and trimertized unsaturated fatty acids, etc.

The epoxide resins also include epoxidized hydrocarbons such as vinyl cyclohexene dioxide, butadiene dioxide, dicyclopentadiene dioxide, epoxidized polybutadiene and limonene dioxide. Other epoxide resins are epoxidized esters, for example, epoxidized soybean oil, epoxidized glycerol trilinoleate, and 3,4-epoxy-cyclohexylmethyl-3,4-epoxy-cyclohexane carboxylate. Still other epoxides are polymers and copolymers of vinyl polymerizable monoepoxides, such monoepoxides being allyl glycidyl ether, glycidyl acrylate and glycidyl methacrylate.

The preferred epoxide resins are the glycidyl polyethers of polyhydric phenols and polyhydric alcohols, particularly the glycidyl polyether of p,p'-dihydroxydiphenyl propane or bisphenol A as it is commonly named.

In preparing the compositions of this invention the aryl sulfonamide-aldehyde resin and the aliphatic polyamine can be separately dissolved and blended with the epoxide resin. However, preferably, the aryl sulfonamide-aldehyde resin is blended with the aliphatic polyamine, using heat when necessary, to form a homogeneous fluid stable "curing agent" which can then be added to the epoxide resin. Premixing of these components has the advantage that only one "curing agent" has to be handled by the ultimate user, eliminating multiple measuring and addition steps. Also the premixed "curing agent" can be blended with the epoxide resin without the necessity of heating the mixture to codissolve the components.

The proportionate amounts of aryl sulfonamide-aldehyde resin and aliphatic polyamine which can be used in this invention will vary from about 5 to about 50 parts by weight of aliphatic polyamine. If less than 5 parts of the resin are used, the rate of cure and the surface properties of the cured product approach those of the unmodified aliphatic polyamine. If more than 50 parts of the resin are used, ultimate properties of the cured product are not obtained without the application of heat and, generally, the cured product is brittle and lacking in chemical and physical resistance properties. The specific proportions of these components will vary within the stated amounts depending upon the particular polyamine being used, the particular epoxide resin being cured and the particular end use of the cured product.

The total amount of aryl sulfonamide-aldehyde resin and aliphatic polyamine reacted with the epoxide resin is based upon the equivalent weight of each component. The equivalent weight of the aryl sulfonamide-aldehyde resin is the weight per each sulfonamide hydrogen present in the molecule, the equivalent weight of the aliphatic polyamine is the weight per each amine hydrogen in the molecule, and the epoxide resin equivalent weight is the weight per each epoxide group. The compositions of this invention can contain about 0.75 to about 1.5 equivalents of aryl sulfonamide-aldehyde resin and aliphatic polyamine to 1 equivalent of epoxide resin. However, in order to obtain optimum properties under room temperature curing conditions, the preferred range is about 1.1 to about 1.2 equivalents of aryl sulfonamide-aldehyde resin and aliphatic polyamine to 1 equivalent of epoxide resin.

Other materials can also be included with the compositions of this invention depending upon the intended use. These other materials include fillers, such as asbestos, aluminum oxide, sand, etc., pigments, dyes, plasticizers, reactive diluents and the like. When used for surface coatings, the compositions can be dissolved in solvents, such as aromatic hydrocarbons, ketones, esters, alcohols, ether-alcohols and ether esters.

Although the compositions of this invention find particular utility when cured at room temperature, their usage is not limited to low temperature cures. They can be cured over a wide range of temperatures from about 15° C. to about 200° C.

The compositions of this invention can be used in preparing 100% solids tile-like coatings or in solvent thinned maintenance and marine coatings. They can also be used as adhesives and in laminates, plastic tooling and the like.

The following examples illustrate the invention described herein. Unless otherwise specified, all parts and percentages are by weight.

Example 1

7.42 parts of a para-toluene sulfonamide-formaldehyde resin having a softening point of 62° C., equivalent weight of 85, specific gravity of 1.35 and a density of 11.2 lbs./gal., were blended with 13.78 parts of iminobispropyl amine by heating to 75° C. until a clear fluid solution was obtained. After cooling to room temperature, this solution was blended with 100 parts of the diglycidyl ether of Bisphenol A having an epoxide equivalent weight of 190 and the blend was poured into a mold to form a ⅛ inch thick casting. After two weeks at 25° C. the physical properties of the cured composition (designated as Composition 1–A) were determined and were compared with the properties of a casting made under identical conditions from 100 parts of the diglycidyl ether of Bisphenol A and 13.8 parts of iminobispropyl amine with no additional accelerator (designated as Composition 1–B).

|  | Composition 1–A | Composition 1–B |
|---|---|---|
| Gel Time, 100 grams at 77° F. (minutes) | 13 | 30 |
| Ultimate tensile strength (p.s.i.) | 11,330 | 9,640 |
| Tensile elongation (percent) | 5 | 2.1 |
| Ultimate flexural strength (p.s.i.) | 21,700 | 16,415 |
| Flexural deflection (inches) | 0.39 | 0.18 |
| Compressive yield strength (p.s.i.) | 14,860 | 13,656 |
| Izod impact (ft. lbs./in. notch) | 0.63 | 0.47 |
| Shore hardness | 87D | 84D |
| Percent weight gain, 24 hrs. at 25° C. in— | | |
| Water | 0.17 | 0.21 |
| 5% acetic acid | 0.73 | 2.8 |
| 15% sodium hydroxide | 0.15 | 0.17 |
| 50/50 xylene/isopropanol | 0.04 | 0.04 |

Example 2

5 parts of the para-toluene sulfonamide formaldehyde resin described in Example 1 were dissolved in 50 parts of amido-amine (the reaction product of one mol of tall oil fatty acids with one mol of tetraethylene pentamine) to form a compatible blend which was then mixed with 100 parts of the diglycidyl ether of Bisphenol A described in Example 1. The gel time at 25° C. of a 100 gram mass of this mixture was 100 minutes. The gel time at 25° C. of a casting ⅛ inch thick was 247 minutes.

The same formulation was repeated except 15 parts of para-toluene sulfonamide-formaldehyde resin were used. A 100 gram mass of this formulation gelled at 51 minutes at 25° C. A ⅛ inch thick casting gelled at 142 minutes at 25° C.

The gel times for the formulation without the para-toluene sulfonamide-formaldehyde resin were 260 minutes for the 100 gram mass and 375 minutes for the ⅛ inch thick casting.

Example 3

5 parts of the para-toluene sulfonamide-formaldehyde resin described in Example 1 were blended with 22 parts of a hydroxyalkylated amine made by reacting 64.1 parts of triethylene tetramine with 35.9 parts of the glycidyl ester of versatic acid. The resulting blend was mixed with 100 parts of the diglycidyl ether of Bisphenol A described in Example 1. The gel time at 25° C. of a 100 gram mass of the mixture was 17 minutes. The gel time at 25° C. of a ⅛ inch thick casting was 54 minutes.

The same formulation was repeated except 15 parts of the para-toluene sulfonamide-formaldehyde resin were used. A 100 gram mass of this formulation gelled at 13 minutes at 25° C. A ⅛ inch thick casting gelled at 35 minutes at 25° C.

The gel times for the formulation without the para-toluene sulfonamide-formaldehyde resin were 30 minutes for the 100 gram mass and 78 minutes for the ⅛ inch thick casting.

Example 4

A curing agent was prepared by mixing and heating at 93° C. for 1 hour 25 parts of a para-toluene sulfonamide-formaldehyde resin, having a softening point of 62° C., equivalent weight of 85, specific gravity of 1.35 and density of 11.2 lbs./gal., 67.5 parts of N-oleyl-1,3-propanediamine and 7.5 parts of diethylamino-ethanol. This curing agent had a viscosity at 25° C. of 76 cps., a weight per gallon of 7.87 lbs., a Gardner color of 4 and equivalent weight of 83.

45 parts of this curing agent were blended with 85 parts of a diglycidyl ether of Bisphenol A having an epoxide equivalent weight of 190 and 15 parts of glycidyl polyether of trimethylol ethane having an epoxide equivalent weight of 160. The resulting blend was poured into a mold to form an open faced casting ⅛ inch thick. After 2 weeks at 25° C. and relative humidity of 70–85%, the surface appearance of the well cured casting was excellent, exhibiting no greasy exudation or carbonate formation. The physical properties of the cured casting were:

| | |
|---|---|
| Ultimate tensile strength (p.s.i.) | 6,500 |
| Tensile elongation (percent) | 5.4 |
| Ultimate flexural strength (p.s.i.) | 14,500 |
| Flexural deflection (inch) | >0.6 |
| Compressive yield strength (p.s.i.) | 9,240 |
| Ultimate compressive strength (p.s.i.) | 26,210 |
| Hardness (Shore D) | 81 |
| Izod impact (ft. lbs./in. notch) | 0.81 |
| Percent weight gain, 24 hrs. at 25° C. in: | |
| Water | 0.30 |
| 5% acetic acid | 1.47 |
| 50/50 xylene/isopropanol | 5.5 |

Example 5

Using the same formulation as described in Example 4, a glass cloth laminate was prepared using 12 plies of Volan A Finished, 181 style glass cloth and wet lay-up technique. The laminate which contained 49% resin was cured for 2 weeks at 25° C. The physical properties of the laminate were as follows:

| | |
|---|---|
| Ultimate tensile strength (p.s.i.) | 32,030 |
| Tensile elongation (percent) | 2 |
| Ultimate flexural strength (p.s.i.) | 49,480 |
| Flexural deflection (inch) | 0.13 |
| Edgewise compressive yield strength (p.s.i.) | 20,720 |
| Izod impact (ft. lbs./in. notch) | 6.4 |
| Interlaminar shear strength (p.s.i.) | 1,070 |
| Percent flexural strength retention after immersion in following reagents for 3 weeks at 25° C.: | |
| Water | 95 |
| 5% acetic acid | 23 |
| 15% sodium hydroxide | 88 |
| 15% hydrochloric acid | 55 |
| Gasoline | 91 |
| Xylene | 42 |

It is to be understood that the foregoing detailed description is given merely by way of illustration and that many variations may be made therein without departing from the spirit of the invention.

The embodiments of this invention in which an exclusive property or privilege is claimed are defined as follows:

1. A room temperature curable composition comprising
    (a) an epoxide compound containing more than one 1,2 epoxide group per molecule,
    (b) an aryl sulfonamide-aldehyde resin which is the reaction product of an aryl sulfonamide having one sulfonamide substituent directly attached to the aromatic ring and an aliphatic aldehyde containing 1 to 8 carbon atoms in the ratio of about 1.1 to about 1.4 mols of aryl sulfonamide to 1 mol of aldehyde, and
    (c) an aliphatic polyamine containing at least 2 amine nitrogen atoms and more than 2 amine hydrogen atoms per molecule, wherein (b) and (c) are in the weight ratio of about 5 to about 50 parts of (b) to 50 parts of (c) and wherein 0.75 to 1.5 total equivalent of sulfonamide hydrogens of (b) and amine hydrogens of (c) are present for each epoxide equivalent of (a).

2. The composition of claim 1 wherein the aryl sulfonamide-aldehyde resin is a para-toluene sulfonamide-formaldehyde resin having a softening point of 40° C. to 80° C.

3. The composition of claim 1 wherein the epoxide compound is a glycidyl polyether of a polyhydric phenol, a polyhydric alcohol, or mixture thereof.

4. The composition of claim 1 wherein the epoxide compound is a glycidyl polyether of p,p'-dihydroxydiphenyl propane.

5. The composition of claim 1 wherein the aliphatic polyamine is iminobispropyl amine.

6. The composition of claim 1 wherein the aliphatic polyamine is N-oleyl-1,3-propanediamine.

7. The composition of claim 1 wherein the equivalents of (a), (b) and (c) are in the ratio of 1 epoxide equivalent of the epoxide compound to 1.1 to 1.2 total sulfonamide and amine equivalents of aryl sulfonamide-aldehyde resin and aliphatic polyamine.

8. The cured composition obtained by curing the composition of claim 1 at room temperature.

References Cited

UNITED STATES PATENTS

| | | | |
|---|---|---|---|
| 2,494,295 | 1/1950 | Greenlee | 260—834 |
| 2,712,001 | 6/1955 | Greenlee | 260—47 |
| 2,847,394 | 8/1958 | Greenlee | 260—75 |
| 3,397,190 | 8/1968 | Toepfl | 260—834 |

MURRAY TILLMAN, Primary Examiner

P. LIEBERMAN, Assistant Examiner

U.S. Cl. X.R.

260—31.4, 32.8, 33.2, 33.4, 33.6, 37, 39, 47.2, 72